United States Patent [19]

Gowan, Jr. et al.

[11] Patent Number: 4,517,347

[45] Date of Patent: May 14, 1985

[54] METHOD FOR COPOLYMERIZATION OF STYRENE AND ACRYLONITRILE

[75] Inventors: John W. Gowan, Jr.; Carlton G. Force, both of Mt. Pleasant, S.C.

[73] Assignee: Westvaco Corporation, New York, N.Y.

[21] Appl. No.: 634,223

[22] Filed: Jul. 25, 1984

[51] Int. Cl.³ .............................................. C08F 212/10
[52] U.S. Cl. ...................................... 526/216; 526/212; 526/342; 524/776; 524/740
[58] Field of Search .................. 526/212, 216, 342; 524/776, 740

[56] References Cited

U.S. PATENT DOCUMENTS

| | | | |
|---|---|---|---|
| 3,160,613 | 12/1964 | Delacretaz et al. | 526/342 |
| 3,160,616 | 12/1964 | Delacretaz et al. | 526/212 |
| 3,160,619 | 12/1964 | Delacretaz et al. | 526/212 |
| 3,424,821 | 1/1969 | Hunter | 260/886 |
| 3,714,122 | 1/1973 | Kline | 526/216 |
| 4,085,169 | 4/1978 | Saito et al. | 526/212 |
| 4,197,400 | 4/1980 | Wollrab et al. | 528/500 |
| 4,241,203 | 12/1980 | Wenzel et al. | 526/218 |

Primary Examiner—Paul R. Michl
Assistant Examiner—Alex H. Walker
Attorney, Agent, or Firm—Terry B. McDaniel; Richard L. Schmalz

[57] ABSTRACT

In the emulsion copolymerization of styrene and acrylonitrile, the copolymer yield can be increased by adding certain antioxidant compounds to the emulsifier. These antioxidant compounds include an aromatic portion and a fatty acid portion, and may be, for example, a hydroquinone-fatty acid ester.

12 Claims, 4 Drawing Figures

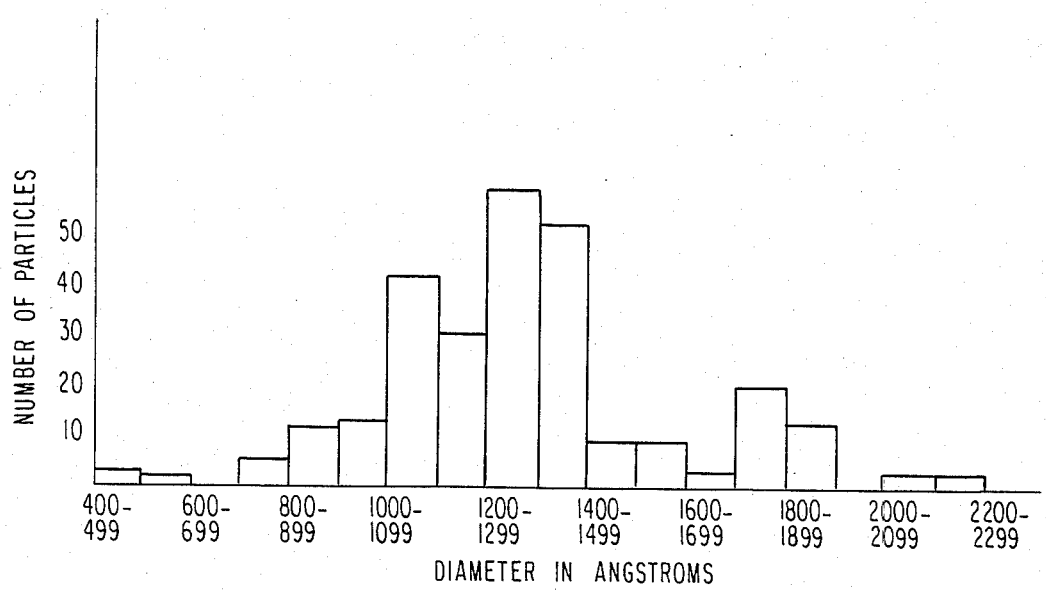
FIG. 1  LATEX PRODUCED WITH RESIN 95
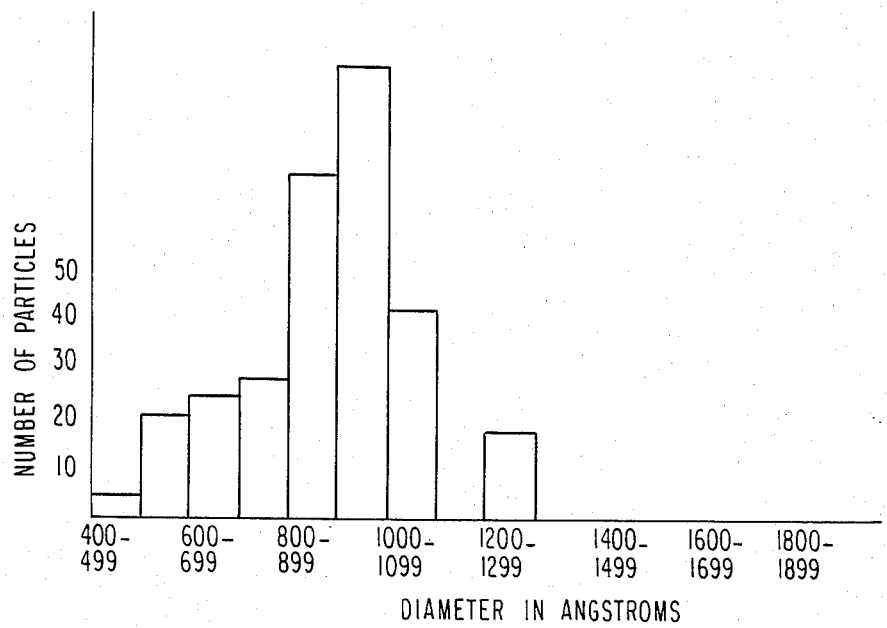
FIG. 2  LATEX PRODUCED WITH RESIN 95 CONTAINING 0.1% PITCH

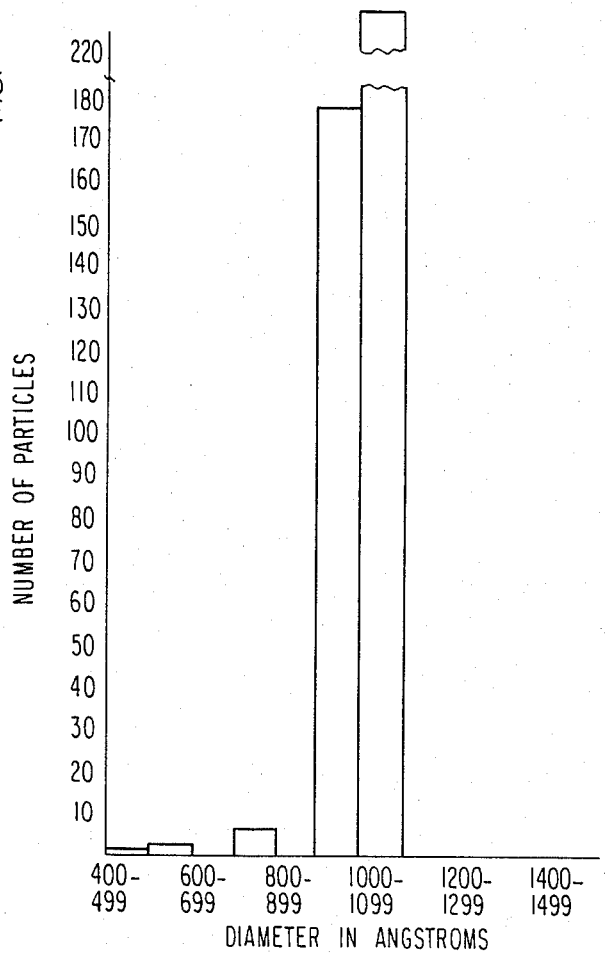
FIG. 3
LATEX PRODUCED WITH RESIN 95 CONTAINING 0.2% HYDROQUINONE STEARATE
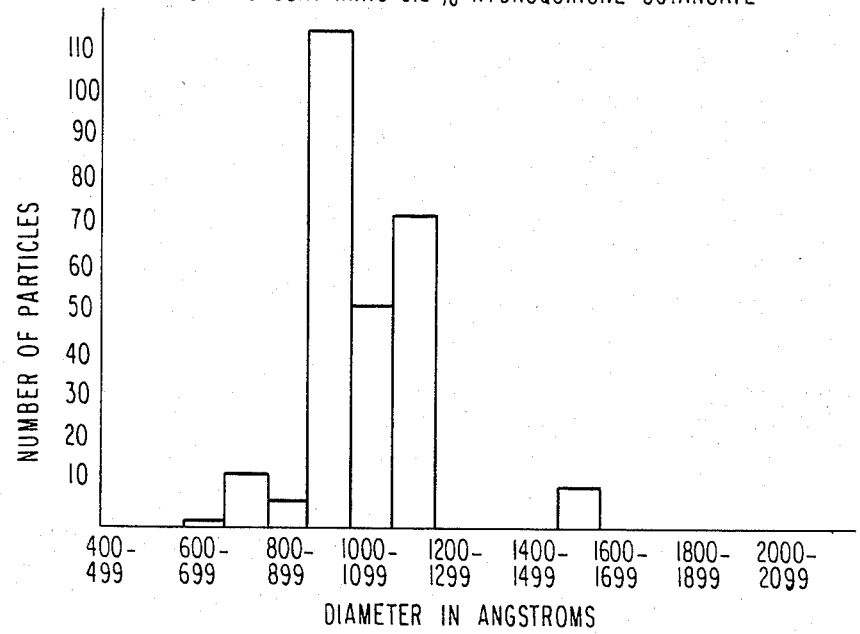
FIG. 4 LATEX PRODUCED WITH RESIN 95 CONTAINING 0.2% HYDROQUINONE OCTANOATE

METHOD FOR COPOLYMERIZATION OF STYRENE AND ACRYLONITRILE

BACKGROUND OF THE INVENTION

The present invention relates to the copolymerization of styrene and acrylonitrile by the emulsion process.

Styrene acrylonitrile copolymers are used currently in a wide variety of products including telephone casings and drain piping.

Styrene acrylonitrile (SAN) copolymers are currently produced by three processes, the emulsion process, the suspension process and the continuous mass process. In the emulsion process, with which this application is concerned, the conversion of the monomers to the copolymers goes to a completion of only 97% of theoretical. The unreacted 3% is effectively wasted in economic terms, and discharge of the unreacted monomers constitutes a problem with respect to pollution, especially in terms of unreacted acrylonitrile which is highly toxic. No fundamental reason has been found why this copolymerization reaction cannot go to completion.

The problem of providing an acrylonitrile copolymer free of residual monomer has been dealt with previously. Thus, in U.S. Pat. Nos. 4,197,400 and 4,241,203, heating of the copolymer is recommended in order to reduce the residual monomer content to a very low level.

SUMMARY OF THE INVENTION

It has now been found that in the emulsion copolymerization of styrene and acrylonitrile, the copolymer yield can be increased by adding certain anti-oxidant compounds to the emulsifier. These anti-oxidant compounds include pitch, hydroquinone stearate, hydroquinone oleate, hydroquinone octanoate, octadecylhydroquinone, and 4-dodecyloxy-2-hydroxybenzophenone, compounds which include an aromatic portion and a fatty acid portion.

BRIEF DESCRIPTION OF THE DRAWINGS

FIG. 1 is a particle size distribution graph for a control latex produced without an antioxidant;

FIG. 2 is a particle size distribution graph for a latex produced with 0.1% pitch;

FIG. 3 is a particle size distribution graph for a latex produced with 0.2% hydroquinone stearate; and FIG. 4 is a particle size distribution graph for a latex produced with 0.2% hydroquinone octanoate.

DETAILED DESCRIPTION OF THE INVENTION

The present invention applies to systems in which styrene and acrylonitrile are copolymerized in an emulsion in the presence of an emulsifier. The emulsifier commonly used in such systems is a rosin soap. Other emulsifiers useful in such systems include saturated fatty acid soaps, sulfosuccinates, and alkyl sulfates.

According to the present invention, a small quantity of an anti-oxidant compound is added to the emulsifier. While the amount of anti-oxidant may vary, the amount most commonly used is 0.1 to 0.4%, based on the weight of the emulsifier.

Anti-oxidant compounds useful according to the present invention are those having an aromatic portion and a fatty acid portion. Examples of useful anti-oxidants include the hydroquinone esters, hydroquinone stearate, hydroquinone octanoate and hydroquinone oleate. Also useful according to the present invention is pitch, which contains fatty acid lignin esters. Compounds which are not esters may also be used according to the present invention. Examples of these compounds are octadecylhydroquinone, and 4-dodecyloxy-2-hydroxybenzophenone. These compounds are not subject to hydrolysis in aqueous media as are esters.

While not wishing to be held to any particular theory, it is thought that the incomplete reaction of styrene and acrylonitrile is due to the low solubility of the monomers in the resulting polymers. This lack of solubility causes a small quantity of monomer (approximately 3%) to remain poorly associated with the growing polymer particles, precluding the possibility of incorporation into the polymer. It should then be possible to improve the yield by reducing the particle size of the resulting polymer, thereby producing more polymer particles and providing more reaction sites for solubilization and reaction of the monomers. It is thought that the anti-oxidants of the present invention slow the growth of particles relative to the initiation of new particles, thereby increasing the number of particles and reaction sites for the reaction of the monomers.

The emulsion polymerization process for styrene and acrylonitrile is a well known reaction. A typical reaction mixture will contain approximately 70 parts by weight styrene and 30 parts by weight acrylonitrile, for a total of 100 parts of monomer. The emulsifier solution added to the monomer mixture typically contains about 2 to 3 parts emulsifier per 100 parts of monomer, and less than 1 part potassium persulfate per 100 parts monomer. The potassium persulfate serves as an initiator in the reaction. The emulsifier itself is typically a rosin soap solution of about 5% concentration.

The monomer solution may also contain a small amount of a chain transfer agent such as tert-dodecylmercaptan, in an amount of 0.4 parts per 100 parts monomer.

The reactants of the SAN copolymerization are purged initially with nitrogen gas and the polymerization run under a nitrogen atmosphere. Portions of both solutions are charged initially into the reaction vessel and the remaining portions added continuously. The reaction is generally run at a temperature of 60° to 100° C. utilizing a reflux condenser. After addition of the monomer and emulsifier is complete, the reaction is continued for another sixty to seventy-five minutes to complete polymerization, with the total reaction time being about three hours.

The present invention is explained further with reference to the following examples.

PREPARATION OF ANTI-OXIDANTS

EXAMPLE 1

A solution of 28.4 gm stearic acid (0.1 mole), 12 gm hydroquinone (0.11 mole), and 1.7 gm p-toluenesulfonic acid (0.01 mole) in toluene was prepared and refluxed three days while water was collected in a Dean-Stark trap. On cooling, crystals formed and were filtered and these grayish crystals were washed with 10 ml cold toluene and copious amounts of distilled water. After drying overnight, the compound was recrystallized from toluene to give 32 gm hydroquinone stearate (81% theoretical) single spot (Thin Layer Chromatography [TLC] 9/1 chloroform/methanol, silica gel) compound, with a melting point 105° C. The NMR spectrum was consistent with the structure of hydroquinone stearate.

EXAMPLE 2

To a solution of 28.2 gm (0.101 mole) oleic acid in toluene, was added 12 gm hydroquinone (0.11 mole) and 1.7 gm p-toluenesulfonic acid (0.01 mole). Water was withdrawn into a Dean-Stark trap as the solvent was refluxed for two days. The solution was cooled and washed with 100 ml water four times, and the solvent was evaporated in vacuo. The crystalline residue was recrystallized from methanol to give 15 gm hydroquinone oleate (40% theoretical) colorless compound, single spot (TLC). The melting point was 85° C. and the NMR was consistent with the structure of hydroquinone oleate.

EXAMPLE 3

Hydroquinone esters of a commercial mixture of oleic, elaidic, and conjugated oleic acids designated "1483" acids were prepared according to the method of Example 2 to give a yield of 28 gm (72% theoretical) slightly colored compound having a melting point of 70° C. A TLC indicated the absence of hydroquinone.

EXAMPLE 4

A 100 gm sample of pitch having an acid number of 40 and a hexane insoluble content of 8.4% was dissolved in 500 ml hexane with stirring and mild warming to 35° C. After cooling to room temperature, the sample was filtered, and the black solid was washed repeatedly with hexane. The solvent was removed overnight in an evacuated dessicator to give a sample of the hexane insoluble portion of the pitch.

EXAMPLE 5

Hydroquinone octanoate was prepared utilizing the method of Example 2 to yield 16 gm (63% theoretical) colorless crystals which were recrystallized from methanol and water and had a melting point of 72° C.

PREPARATION OF EMULSIFIER SOAP

EXAMPLE 6

The basis for the emulsifier was a rosin known as Resin 95. The anti-oxidant additives of the present invention were dissolved in molten Resin 95 at the appropriate level. In order to prepare the emulsifier soap, Resin 95 was dissolved in potassium hydroxide solution, the pH was adjusted to 10.6, and the solution diluted to 125.88 ml.

POLYMERIZATION REACTION

EXAMPLES 7-49

A reaction vessel was set up equipped with a mechanical stirrer, cooling coils, a heating mantel, a thermometer, and two calibrated dropping funnels. One dropping funnel contained the monomers, and the other dropping funnel contained the emulsifier solution. Both dropping funnels were closed and purged continuously with nitrogen.

1.89 gm of potassium persulfate were dissolved in 448.14 ml of distilled water which was also degassed by boiling to eliminate oxygen. This potassium persulfate solution was added to the reaction vessel, followed by 20.98 ml of emulsifier solution. The monomer and remaining emulsifier were then added to the reaction vessel over a four hour period with the reaction vessel being kept under a nitrogen atmosphere at 65° C. Stirring at 65° C. was continued for seventy-five minutes after the monomer addition was complete.

The percent conversion was computed as follows:

% non-monomer solids = 0.025

$$2.4634 = \frac{\text{parts water + monomer + emulsifier + initiator}}{\text{parts monomer + initiator + emulsifier}}$$

(% solids)(2.4634) − 0.025 = % conversion

The results of polymerization run 7 through 49 are given in Table 1.

TABLE 1

| Example | % Additive | Additive | % Conversion |
|---|---|---|---|
| 7 | — | Control | 94.82 |
| 8 | 0.1 | Hexane Insoluble Pitch | 96.48 |
| 9 | — | Control | 93.88 |
| 10 | 0.2 | Hexane Insoluble Pitch | 99.99 |
| 11 | — | Control | 96.4 |
| 12 | 0.1 | Pitch | 99.92 |
| 13 | 0.2 | Pitch | 98.8 |
| 14 | — | Control | 97.8 |
| 15 | 0.2 | Hexane Insoluble Pitch | 98.14 |
| 16 | — | Control | 97.4 |
| 17 | 0.2 | Hexane Insoluble Pitch | 98.8 |
| 18 | 0.3 | Hydroquinone Stearate | 99.32 |
| 19 | — | Control | 99.9 |
| 20 | 0.4 | Hydroquinone Stearate | 98.3 |
| 21 | 0.4 | Hydroquinone Stearate | 99.5 |
| 22 | 0.2 | Hydroquinone 1483 | 98.9 |
| 23 | — | Control | 96.2 |
| 24 | 0.3 | Hydroquinone Stearate | 100.30 |
| 25 | — | Control | 95.4 |
| 26 | 0.4 | Hydroquinone Stearate | 94.0 |
| 27 | 0.2 | Hydroquinone Stearate | 94.7 |
| 28 | 0.3 | Hydroquinone Stearate | 94.3 |
| 29 | — | Control | 91.21 |
| 30 | 0.3 | Hydroquinone Stearate | 94.3 |
| 31 | 0.2 | Hydroquinone 1483 | 90.25 |
| 32 | 0.2 | Hydroquinone Stearate | 92.5 |
| 33 | — | Control | 93.8 |
| 34 | 0.2 | Hydroquinone 1483 | 89.90 |
| 35 | — | Control | 90.5 |
| 36 | — | Control | 93.5 |
| 37 | 0.3 | Hydroquinone Stearate | 98.9 |
| 38 | — | Control | 92.2 |
| 39 | 0.2 | Hydroquinone Stearate | 95.3 |
| 40 | 0.2 | Hexane Insoluble Pitch | 96.25 |
| 41 | 0.3 | Hydroquinone Stearate | 99.8 |
| 42 | 0.3 | Hydroquinone Stearate | 99.97 |
| 43 | 0.2 | Hydroquinone Stearate | 97.2 |
| 44 | 0.2 | Hydroquinone Stearate | 95.4 |
| 45 | — | Control | 93.2 |
| 46 | — | Control | 88.0 |
| 47 | 0.2 | Hydroquinone Octanoate | 98.3 |
| 48 | 0.3 | Hydroquinone Stearate | 93.0 |
| 49 | — | Control | 89.0 |

EXAMPLES 50-53

Particle size analyses were made for four styrene-acrylonitrile latex samples, a control sample, and one sample each prepared with 0.1% pitch, 0.2% hydroquinone stearate, and 0.2% hydroquinone octanoate. Electron micrographs were taken of the four samples in order to determine particle size. The mean and number average particle diameters are given in Table 2.

TABLE 2

| Example | % Additive | Additive | Mean Particle Diameter (Angstroms) | Number Average Particle Diameter (Angstroms) |
|---|---|---|---|---|
| 50 | — | Control | 1620 A | 1348 A |
| 51 | 0.1 | Pitch | 782 A | 768 A |
| 52 | 0.2 | Hydroquinone Stearate | 1323 A | 986 A |
| 53 | 0.2 | Hydroquinone Octanoate | 1093 A | 1036 A |

FIGS. 1 through 4 show the particle size distribution for each sample. It is graphically clear from these figures the degree to which the anti-oxidant additives of the present invention reduce the size of the particles and the width of the particle size distributions. Thus, the control sample has particles as large as 2200 angstroms with the distribution centering between 1200 and 1300 angstroms.

With additives, at least about 90% of the particles were below about 1200 Angstroms in size compared to only 40% without additives. Further, with the additives of the invention, the majority of the particles, and in fact no less than about 68%, were within the range of 800 to 1200 Angstroms. Without additives only about 35% of the particles were within this range.

With reference to the individual Figures, hydroquinone stearate (FIG. 3) produced virtually all particles between 900 and 1100 Angstroms, with no larger diameter particles being found. The latex produced with the hydroquinone octanoate (FIG. 4) also has a relatively narrow distribution, with most particles being between 900 and 1200 angstroms, and a few particles being between 1500 and 1600 angstroms. The latex produced with pitch (FIG. 2) has a narrower distribution than the control sample but a broader distribution than the latexes produced with hydroquinone stearate and octanoate. The latex produced with pitch had no particles larger than 1300 angstroms.

The above examples are not deemed to be limiting and those of ordinary skill in the art will recognize the applicability of the invention outside the scope of the examples but within the scope of the following claims.

What is claimed is:

1. In a method of emulsion polymerization of styrene and acrylonitrile wherein styrene and acrylonitrile are copolymerized in an aqueous medium in the presence of an emulsifier, the improvement comprising adding to said medium an anti-oxidant selected from the group consisting of an anti-oxidant compound comprising an aromatic portion and a fatty acid portion, octadecyl hydroquinone, and 4-dodecyloxy-2-hydrobenzophenone in an amount sufficient to increase the yield of styrene-acrylonitrile copolymer.

2. The method of claim 1, wherein said anti-oxidant compound is selected from the group consisting of pitch, the hexane insoluble portion of pitch, hydroquinone stearate, hydroquinone oleate, hydroquinone octanoate, and mixtures thereof.

3. The method of claim 1, wherein said anti-oxidant compound is incorporated in the emulsifier prior to conducting the polymerization.

4. The method of claim 1, wherein said anti-oxidant compound is present in an amount of about 0.1 to about 0.4% based on the weight of the emulsifier.

5. The method of claim 1, wherein potassium persulfate is added to said polymerization as an initiator.

6. The method of claim 1, wherein said polymerization is run under nitrogen gas.

7. The method of claim 1, wherein said polymerization is carried out at about 65° to about 100° C.

8. The method of claim 1, wherein about 2 parts by weight emulsifier is added to said polymerization for each 100 parts by weight of monomer.

9. The method of claim 1, wherein said copolymer is in the form of particles, about 90% of said particles being less than 1200 Angstroms in size.

10. The method of claim 1, wherein said copolymer is in the form of particles, the majority of said particles being in size range of about 800 to 1200 Angstroms.

11. A method for the emulsion copolymerization of styrene and acrylonitrile, comprising the steps of:
 (a) adding to a reaction vessel an aqueous solution containing about 0.5% potassium persulfate;
 (b) preparing a mixture of about 70 parts by weight styrene and about 30 parts by weight acrylonitrile, said mixture being purged with nitrogen;
 (c) preparing an aqueous solution containing 2 parts by weight rosin soap per 100 parts by weight styrene and acrylonitrile, said rosin soap solution containing 0.1 to about 0.4% based on the weight of the rosin soap of an anti-oxidant selected from the group consisting of an anti-oxidant compound comprising an aromatic portion and a fatty acid portion, octadecyl hydroquinone, and 4-dodecyloxy-2-hydrobenzophenone, the total volume of said rosin soap solution being about 25 to about 35% of the volume of said potassium persulfate solution;
 (d) adding to said potassium persulfate solution about one sixth of the volume of said rosin soap solution;
 (e) slowly adding to said potassium persulfate solution containing said rosin soap solution said styrene-acrylonitrile mixture and the remainder of said rosin soap solution, all said additions taking place under a nitrogen atmosphere at about 65° C.;
 (f) maintaining the mixture of (e) at about 65° C. for a time sufficient to complete said polymerization of styrene and acrylonitrile; and
 (g) separating styrene-acrylonitrile copolymer from the mixture of step (f).

12. The method of claim 11 wherein said anti-oxidant compound is selected from the group consisting of pitch, the hexane insoluble portion of pitch, hydroquinone stearate, hydroquinone oleate, hydroquinone octanoate, and mixtures thereof.

* * * * *